(12) United States Patent
Chang et al.

(10) Patent No.: US 11,749,442 B2
(45) Date of Patent: Sep. 5, 2023

(54) MAGNETIC ELEMENT AND POWER MODULE WITH SAME

(71) Applicant: Delta Electronics, Inc., Taoyuan (TW)

(72) Inventors: Xueliang Chang, Taoyuan (TW); Da Jin, Taoyuan (TW); Yahong Xiong, Taoyuan (TW); Xiaodong Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 101 days.

(21) Appl. No.: 17/400,347

(22) Filed: Aug. 12, 2021

(65) Prior Publication Data
US 2022/0051842 A1    Feb. 17, 2022

(30) Foreign Application Priority Data
Aug. 17, 2020   (CN) .......................... 202010825096.0

(51) Int. Cl.
| H01F 27/26 | (2006.01) |
| H01F 41/06 | (2016.01) |
| H02M 3/335 | (2006.01) |
| H01F 27/28 | (2006.01) |

(52) U.S. Cl.
CPC ............ *H01F 27/26* (2013.01); *H01F 27/28* (2013.01); *H01F 41/06* (2013.01); *H02M 3/335* (2013.01)

(58) Field of Classification Search
CPC .......... H01F 27/26; H01F 27/28; H01F 41/06; H02M 3/335
See application file for complete search history.

(56) References Cited

U.S. PATENT DOCUMENTS

| 10,389,258 | B2 * | 8/2019 | Njiende ................ H02M 3/285 |
| 10,498,245 | B2 * | 12/2019 | Njiende T. .......... H01F 27/2823 |
| 2022/0006394 | A1 * | 1/2022 | Jin ........................ H02M 7/003 |

FOREIGN PATENT DOCUMENTS

| CN | 102364637 A | 2/2012 |
| CN | 106653334 A | 5/2017 |
| JP | 2002025834 A | 1/2002 |

* cited by examiner

*Primary Examiner* — Adolf D Berhane
(74) *Attorney, Agent, or Firm* — KIRTON McCONKIE; Evan R. Witt

(57) ABSTRACT

A magnetic element includes at least one primary winding, at least one secondary winding, a magnetic core, and an auxiliary winding. A winding segment or an entire of the primary winding or a winding segment or an entire of the secondary winding is defined as a parallel-connected winding set. The magnetic core includes a plurality of winding legs, two lateral legs, and two connection parts. The at least one primary winding and the at least one secondary winding are wound around each winding leg. The directions of magnetic fluxes through every two adjacent winding legs are opposite. The auxiliary winding is wound on one of two lateral legs, and electrically connected with the parallel-connected winding set. A direction of a magnetic flux generated by the auxiliary winding is opposite to a direction of the magnetic flux through the adjacent winding leg.

19 Claims, 20 Drawing Sheets

MAGNETIC ELEMENT AND POWER MODULE WITH SAME

CROSS-REFERENCE TO RELATED APPLICATION

This application claims priority to China Patent Application No. 202010825096.0, filed on Aug. 17, 2020. The entire contents of the above-mentioned patent application are incorporated herein by reference for all purposes.

FIELD OF THE INVENTION

The present disclosure relates to a magnetic element, and more particularly to a magnetic element including a magnetic core with controllable magnetic flux and a power module with the magnetic element.

BACKGROUND OF THE INVENTION

With the rapid development of Internet and artificial intelligence, the demands on the power modules with high efficiency and high power density are increasing. Generally, the power module is equipped with a magnetic element such as a transformer and an inductor. The structure of the magnetic element and the winding method of the winding coil are closely related to the efficiency and size of the power module and ultimately affect the power density and cost of the power module.

Nowadays, the magnetic element used in the power module includes a plurality of magnetic legs in order to reduce the loss and size. However, because of the distribution parameters, the magnetic flux of the magnetic element with a plurality of magnetic legs cannot be effectively controlled. Consequently, it is only possible to change the size of the specific part of the magnetic element in a more precise manner in order to control the magnetic flux through the adjustment of the magnetic flux path. However, since it is difficult to design the above magnetic element, the mass production is not feasible.

SUMMARY OF THE INVENTION

An object of the present disclosure provides a magnetic element and a power module with the magnetic element in order to effectively controlling the magnetic flux.

In accordance with an embodiment of the present disclosure, a magnetic element is provided. The magnetic element includes at least one primary winding, at least one secondary winding, a magnetic core, and an auxiliary winding. At least one of a winding segment or an entire of the at least one primary winding and a winding segment or an entire of the at least one secondary winding is defined as a parallel-connected winding set. The magnetic core includes a plurality of winding legs, a first lateral leg, a second lateral leg, a first connection part, and a second connection part. The plurality of winding legs, the first lateral leg, and the second lateral leg are arranged between the first connection part and the second connection part. The plurality of winding legs are sequentially arranged along a linear direction. The first lateral leg and the second lateral leg are respectively arranged on both sides of the plurality of winding legs. The at least one primary winding and the at least one secondary winding are wound around each winding leg. The directions of magnetic fluxes through every two adjacent winding legs are opposite. The auxiliary winding is wound on one of the first lateral leg and the second lateral leg, and electrically connected with the parallel-connected winding set. A turn ratio of the auxiliary winding to the parallel-connected winding set is N:1, wherein N is a positive value. A direction of a magnetic flux generated by the auxiliary winding is opposite to a direction of the magnetic flux through the adjacent winding leg.

In accordance with another embodiment of the present disclosure, a power module is provided. The power module includes the magnetic element as mentioned above, a primary side circuit, and a secondary side circuit. The primary side circuit is electrically connected with the at least one primary winding. The secondary side circuit is electrically connected with the at least one secondary winding.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The present disclosure provides a magnetic element with controllable magnetic flux distribution. The magnetic element includes at least one primary winding, at least one secondary winding, a magnetic core, and an auxiliary winding. At least one of a winding segment or an entire of the at least one primary winding and a winding segment or an entire of the at least one secondary winding are connected with each other and collaboratively defined as a parallel-connected winding set. In one embodiment, the parallel-connected winding set is defined by a winding segment or an entire of the at least one primary winding or a winding segment or an entire of the at least one secondary winding. The magnetic core includes a plurality of winding legs, a first lateral leg, a second lateral leg, a first connection part, and a second connection part. The plurality of winding legs, the first lateral leg, and the second lateral leg are arranged between the first connection part and the second connection part. The plurality of winding legs are sequentially arranged along a linear direction. The first lateral leg and the second lateral leg are respectively arranged on both sides of the plurality of winding legs. The at least one primary winding and the at least one secondary winding are wound around each winding leg. The directions of magnetic fluxes through each two adjacent winding legs are opposite. The auxiliary winding is wound on one of the first lateral leg and the second lateral leg, and electrically connected in parallel with the parallel-connected winding set. A turn ratio of the auxiliary winding to the parallel-connected winding set is N:1, wherein N is a positive value. A direction of a magnetic flux generated by the auxiliary winding is opposite to a direction of the magnetic flux through the adjacent winding leg. By the auxiliary winding wound on one of the lateral legs and the turn ratio of the auxiliary winding to the parallel-connected winding set, the magnetic potential of the lateral leg is clamped by the magnetic potential of the parallel-connected winding set. Consequently, the distribution of the AC magnetic flux in the magnetic element is controllable.

Figure 1:
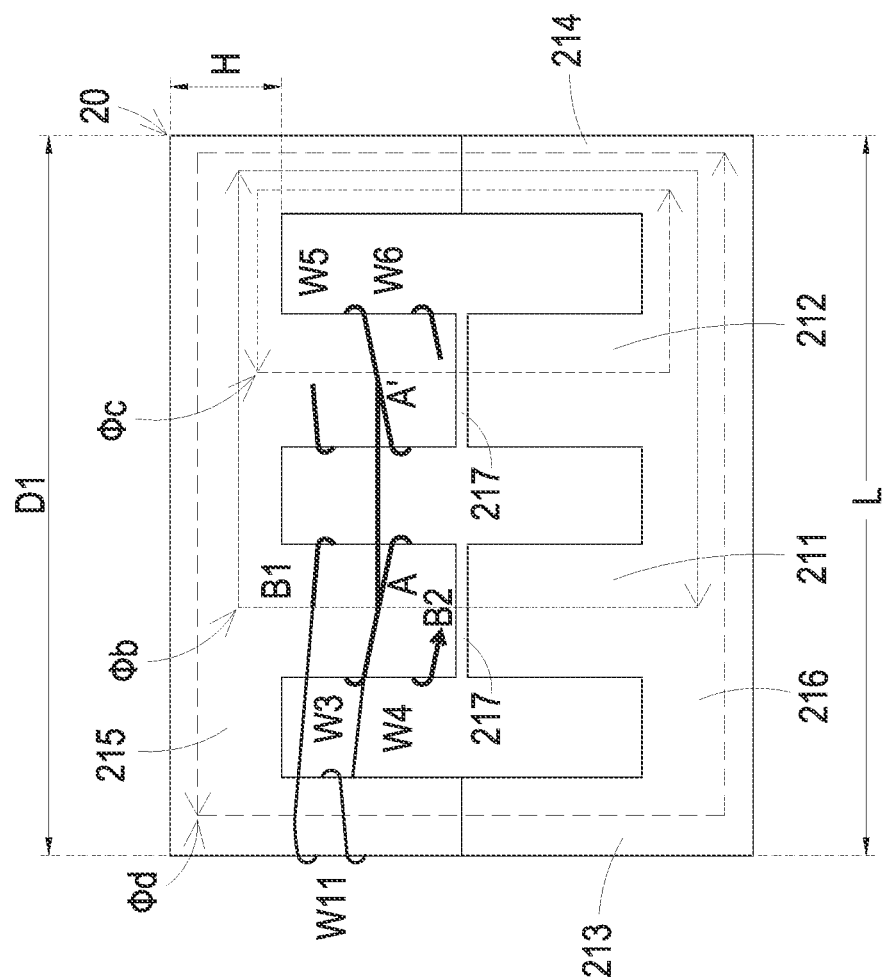
FIG. 1 is a schematic view illustrating the structure of a magnetic element according to a first embodiment of the present disclosure.
Figure 2:
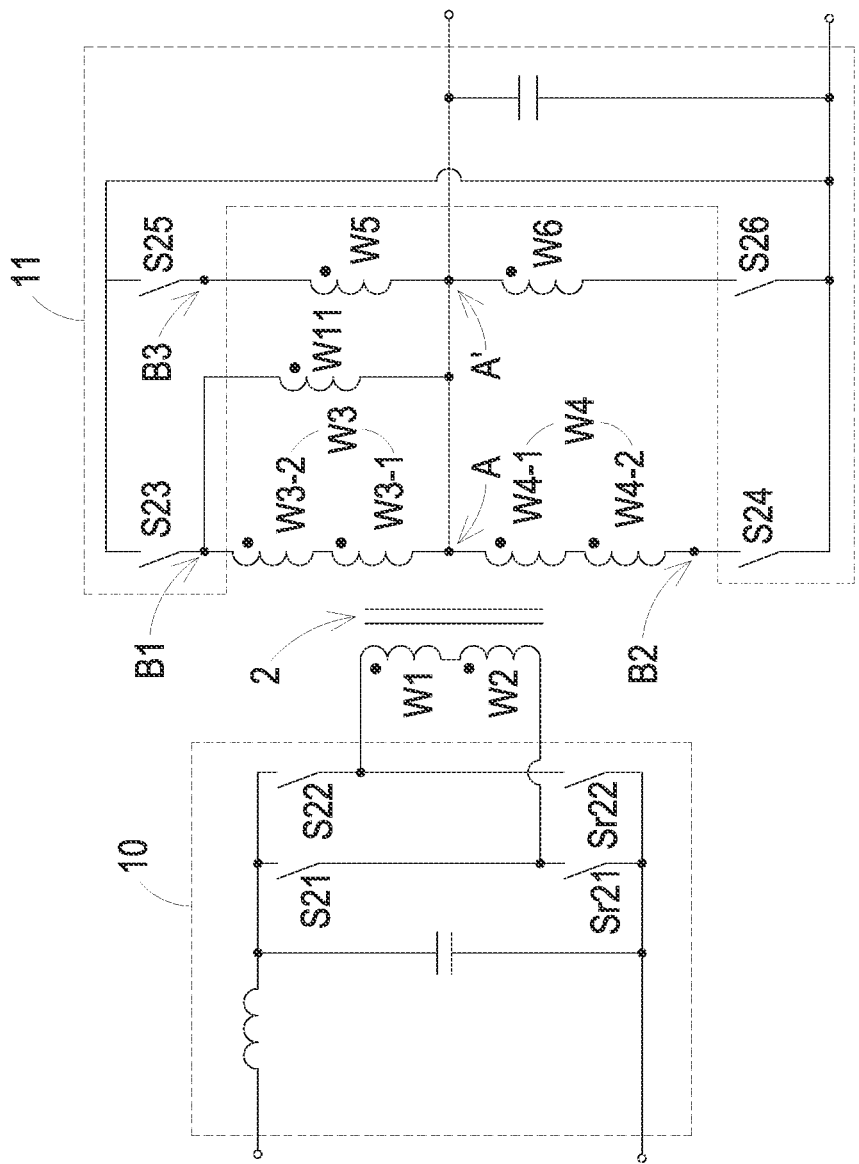
FIG. 2 is a schematic circuit diagram illustrating a power module with the magnetic element as shown in FIG. 1.
Figure 3:
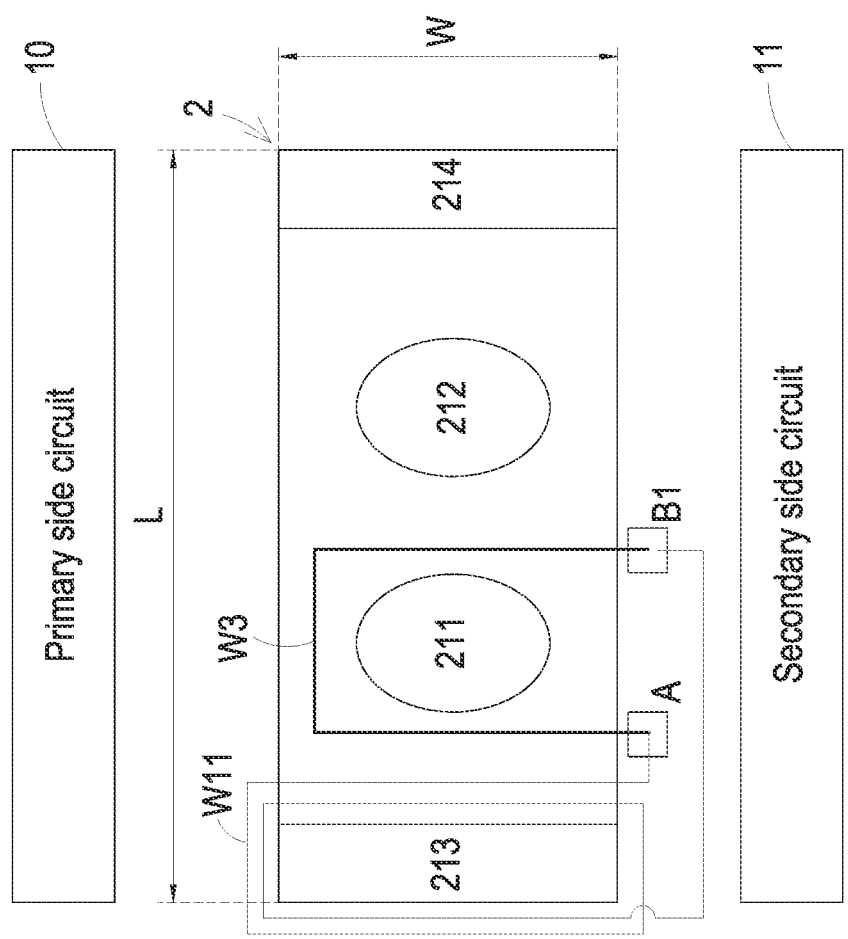
FIG. 3 schematically illustrating a winding method of the magnetic element as shown in FIG. 1.

Please refer to FIGS. 1, 2, and 3. FIG. 1 is a schematic view illustrating the structure of a magnetic element according to a first embodiment of the present disclosure. FIG. 2 is a schematic circuit diagram illustrating a power module with the magnetic element as shown in FIG. 1. FIG. 3 schematically illustrating a winding method of the magnetic element as shown in FIG. 1. Preferably but not exclusively, the magnetic element 2 may include a transformer. The magnetic element 2 may be applied to the power module 1A as shown in FIG. 2. In an embodiment, the power module 1A includes a primary side circuit 10, a magnetic element 2, and a secondary side circuit 11. The primary side circuit 10 includes four first switching units S21, S22, Sr21, and Sr22. The four first switching units S21, S22, Sr21, and Sr22 are collaboratively formed as a full-bridge circuit. The first switching unit S21 and the first switching unit Sr21 are connected with each other and collaboratively formed as a first bridge arm. The first switch unit S22 and the first switch unit Sr22 are connected with each other and collaboratively formed as a second bridge arm.

The magnetic element 2 includes a first primary winding W1, a second primary winding W2, a first group of secondary windings (W3, W4), a second group of secondary windings (W5, W6), and an auxiliary winding W11. The first primary winding W1 is electrically connected with the second primary winding W2 and the primary circuit 10. That is, the first primary winding W1 and the second primary winding W2 are connected between the midpoint of the first bridge arm and the midpoint of the second bridge arm. The first group of secondary windings (W3, W4) and the second group of secondary windings (W5, W6) are magnetically coupled with the first primary winding W1 and the second primary winding W2. The first group of secondary windings (W3, W4) includes a first secondary winding W3 and a second secondary winding W4 with a center-tapped structure. The second group of secondary windings (W5, W6) includes a third secondary winding W5 and a fourth secondary winding W6 with a center-tapped structure and is electrically connected in parallel with the first group of secondary windings (W3, W4). The first secondary winding W3 and the second secondary winding W4 are connected with a node A. The third secondary winding W5 and the fourth secondary winding W6 are connected with a node A'. In this embodiment, the first secondary winding W3 and the auxiliary winding W11 are connected with each other in parallel. In this context, the at least one winding that is electrically connected with the auxiliary winding W11 in parallel is defined as a parallel-connected winding set. The first terminal of the auxiliary winding W11 and the first terminal of the first secondary winding W3 are dotted terminals with the same polarity and electrically connected with the node B1. The second terminal of the auxiliary winding W11 and the second terminal of the first secondary winding W3 are connected with the node A. The ratio between the turn numbers of the auxiliary winding W11 and the first secondary winding W3 is N:1, where N is a positive integer, and preferably N is 2 in one embodiment. In the following example, N=2.

In this embodiment, the auxiliary winding W11 and the first secondary winding W3 are connected with each other in parallel. It is noted that numerous modifications and alterations may be made while retaining the teachings of the disclosure. For example, in another embodiment, the auxiliary winding W11 and another secondary winding are connected with each other in parallel.

In the embodiment, any one of the secondary windings may be divided into two winding segments. As shown in FIG. 2, the first secondary winding W3 is divided into a first winding segment W3-1 and a second winding segment W3-2, and the second secondary winding W4 is divided into a first winding segment W4-1 and a second winding segment W4-2. The auxiliary winding W11 is electrically connected with a portion of the parallel-connected winding set in parallel. That is, the auxiliary winding W11 may be electrically connected with a winding segment of the first secondary winding W3, for example the auxiliary winding W11 may be electrically connected with the first winding segment W3-1 or the second winding segment W3-2 of the first secondary winding W3. Alternatively, the auxiliary winding W11 may be electrically connected with a portion of the first secondary winding W3 and a portion of the first secondary winding W4 in parallel. The detail may be described with the figures hereinafter.

The secondary side circuit 11 is electrically connected with the first group of secondary windings (W3, W4) and the second group of secondary windings (W5, W6). The secondary side circuit 11 includes four second switching units S23, S24, S25, and S26. The second switching unit S23 is electrically connected with the first secondary winding W3. The second switching unit S24 is electrically connected with the second secondary winding W4. The second switching unit S25 is electrically connected with the third secondary winding W5. The second switching unit S26 is electrically connected with the fourth secondary winding W6. The first secondary winding W3 and the second switching unit S23 are electrically connected to the node B1. The second secondary winding W4 and the second switching unit S24 are electrically connected with the node B2. In some embodiments, the first group of secondary windings (W3, W4) and the second group of secondary windings (W5, W6) are electrically connected with each other in parallel, and the secondary side circuit 11 is electrically connected with the first group of secondary windings (W3, W4) and the second group of secondary windings (W5, W6). Consequently, the secondary side of the magnetic element 2 (i.e., transformer) of the power module 1A includes two center-tapped rectifier circuits to form two loops connected in parallel.

Please refer to FIG. 1 again. In order to better understand the technology of the present disclosure, the winding methods of the first primary winding W1 and the second primary winding W2 are not shown in FIG. 1. The magnetic element 2 includes a magnetic core 20. The magnetic core 20 includes a first winding leg 211, a second winding leg 212, a first lateral leg 213, a second lateral leg 214, a first connection part 215, and a second connection part 216. The first connection part 215 and the second connection part 216 are connected with the first winding leg 211, the second winding leg 212, the first lateral leg 213, and the second lateral leg 214. The first lateral leg 213 and the second lateral leg 214 are arranged between the first connection part 215 and the second connection part 216. In addition, the first lateral leg 213 and the second lateral leg 214 are arranged on both sides of the first winding leg 211 and the second winding leg 212, respectively. The first winding leg 211 and the second winding leg 212 are arranged between the first lateral leg 213 and the second lateral leg 214. Moreover, the first winding leg 211 and the second winding leg 212 are separated from the first lateral leg 213 and the second lateral leg 214 at a specified distance. In other words, the first lateral leg 213, the first winding leg 211, the second winding leg 212, and the second lateral leg 214 are sequentially arranged along the linear direction D1. In this embodiment, at least one virtual line passes through the first winding leg 211 and the second winding leg 212. As shown in FIG. 1, each of the first connection part 215 and the second connection part 216 has a length L, a width W (see FIG. 3) and a height H. The linear direction D1 is in parallel with the length direction of the magnetic core 20. Moreover, the first connection part 215 and the second connection part 216 are divided into three sections by the first winding leg 211, the second winding leg 212, the first lateral leg 213, and the second lateral leg 214. The first section is approximately arranged between the first lateral leg 213 and the first winding leg 211. The second section is approximately arranged between the first winding leg 211 and the second winding leg 212. The third section is approximately arranged between the second winding leg 212 and the second lateral leg 214.

In some embodiments, each of the first winding leg 211 and the second winding leg 212 includes a first air gap 217, and the first lateral leg 213 and the second lateral leg 214 may not be equipped with air gaps. In some other embodiments, each of the first winding leg 211 and the second winding leg 212 includes a first air gap 217, and each of the first lateral leg 213 and the second lateral leg 214 may be equipped with a second air gap (not shown). The height of the second air gap may be smaller than 1/10 of the height of the first air gap 217. Moreover, the turn numbers of the first secondary winding W3, the second secondary winding W4, the third secondary winding W5, and the fourth secondary winding W6 may be equal.

In an embodiment, the first secondary winding W3 and the second secondary winding W4 are wound on the first winding leg 211 in the same winding direction (e.g., in the counterclockwise direction as shown in FIG. 1). Moreover, the first secondary winding W3 and the second secondary winding W4 are electrically connected with the node A. The AC magnetic flux generated by the first secondary winding W3 and the second secondary winding W4 on the first winding leg 211 is $\Phi b$. The third secondary winding W5 and the fourth secondary winding W6 are wound on the second winding leg 212 in the same winding direction (e.g., in the clockwise direction). Moreover, the third secondary winding W5 and the fourth secondary winding W6 are electrically connected to the node A'. The node A and the node A' are electrically connected through an external wire or a trace on a printed circuit board of the power module 1A. The AC magnetic flux generated by the third secondary winding W5 and the fourth secondary winding W6 on the second winding leg 212 is $\Phi c$. The auxiliary winding W11 is wound on the first lateral leg 213 in a clockwise direction for example. Moreover, the auxiliary winding W11 is electrically connected with the first secondary winding W3 in parallel. The terminal voltage of the auxiliary winding W11 is clamped by the terminal voltage of the first secondary winding W3. The AC magnetic flux generated by the auxiliary winding W11 on the first lateral leg 213 is Dd. According to the winding direction, the direction of the AC magnetic flux $\Phi c$ is the same as the direction of the AC magnetic flux $\Phi d$, and the direction of AC magnetic flux $\Phi b$ is opposite to the direction of the AC magnetic flux $\Phi c$ and the direction of the AC magnetic flux $\Phi d$. As mentioned above, each of the first winding leg 211 and the second winding leg 212 includes a first air gap 217, and the first lateral leg 213 and the second lateral leg 214 are not equipped with air gaps. Alternatively, each of the first winding leg 211 and the second winding leg 212 includes a first air gap 217, and each of the first lateral leg 213 and the second lateral leg 214 is equipped with a second air gap (not shown). The height of the second air gap is smaller than 1/10 of the height of the first air gap 217. Consequently, all of the AC magnetic fluxes $\Phi b$, $\Phi c$, and $\Phi d$ flow to the second lateral leg 214.

In an embodiment, the ratio between the turn numbers of the auxiliary winding W11 and the first secondary winding W3 is 2:1. Consequently, the relationship between the AC magnetic flux did and the AC magnetic flux $\Phi b$ may be expressed as: $\Phi d = \Phi b/2$.

The AC magnetic flux $\Phi b$ is equal to the AC magnetic flux $\Phi c$. If the direction of the magnetic flux is not considered, the AC magnetic flux flowing through the second lateral leg 214 is $\Phi c + \Phi d - \Phi b = \Phi d/2$. Consequently, the cross-sectional area of the first lateral leg 213 perpendicular to the height H (i.e., along the linear direction D1) is a half of the cross-sectional area of the first winding leg 211 (or the second winding leg 212) perpendicular to the height H. Similarly, the cross-sectional area of the second lateral leg 214 perpendicular to the height H (i.e., along the linear direction D1) is a half of the cross-sectional area of the first winding leg 211 (or the second winding leg 212) perpendicular to the height H.

Moreover, the AC magnetic flux flowing in the first section of the first connection part 215 and the second connection part 216 is $\Phi d$, the AC magnetic flux flowing in the second section is $\Phi b-\Phi d$ (i.e., $=\Phi d$), and the AC magnetic flux flowing in the third section is $\Phi c+\Phi d-\Phi b$ (i.e., $=\Phi d$). In other words, the AC magnetic flux flowing through the first connection part 215 and the second connection part 216 of the magnetic element 2 is reduced. Due to the arrangement of the auxiliary winding W11, the AC magnetic flux of the first lateral leg 213 is equal to the AC magnetic flux of the second lateral leg 214. Consequently, the AC magnetic flux flowing through each part of the magnetic element 2 is controllable, and the magnetic element 2 can be designed in a simplified manner. In such way, the magnetic element 2 is suitable for mass production while maintaining the performance consistency.

Please refer to FIG. 3. In FIG. 3, only the winding methods of the first secondary winding W3 and the auxiliary winding W11 are shown. In case that the first secondary winding W3 is wound on the first winding leg 211 in a counterclockwise direction, the auxiliary winding W11 is wound on the first lateral leg 213 in a clockwise direction. The auxiliary winding W11 and the secondary winding W3 are electrically connected in parallel and connected between the node A and the node B1. As mentioned above, the ratio between the turn number of the auxiliary winding W11 and the turn number of the first secondary winding W3 is N:1, where N is a positive integer. As shown in FIG. 3, the turn number of the first secondary winding W3 is 1, and the turn number of the auxiliary winding W11 is 2.

In some embodiments, the power transferred through the auxiliary winding W11 may be equal to or lower than 50% of the total power transferred through the magnetic element 2. All mentioned embodiments of the present disclosure may be applicable under this condition. The winding widths of the first secondary winding W3 and the auxiliary winding W11 may be designed according to practical requirements. According to the design, the winding width of the auxiliary winding W11 may be much smaller than the winding width of the first secondary winding W3. Consequently, the equivalent excitation inductance of the auxiliary winding W11 may be much lower than the equivalent excitation inductance of the first secondary winding W3. In such way, a greater portion of the power is transferred to the output side of the power module 1A through the first secondary winding W3. In some other embodiments, the winding width of the auxiliary winding W11 may be properly increased as long as the winding width of the auxiliary winding W11 is smaller than the winding width of the first secondary winding W3. Consequently, a portion of the energy can be transferred through the auxiliary winding W11. In other words, the winding width of the auxiliary winding W11 can be designed according to the principle of energy distribution.

As mentioned above, the ratio between turn numbers of the auxiliary winding W11 and the first secondary winding W3 is N:1, where N is a positive integer. In some embodiments, N may be larger than 2. That is, the turn number of the first secondary winding W3 is 1, and the turn number of the auxiliary winding W11 is N. The winding direction and the generated AC magnetic flux are identical to those of FIG. 1. In this case, the AC magnetic flux generated by the auxiliary winding W11 on the first lateral leg 211 is $\Phi d=\Phi b/N$. Consequently, the distribution of the AC magnetic flux in the magnetic element is different from that of the previous embodiment. Consequently, the AC magnetic flux flowing through each part of the magnetic element 2 is controllable, and the performance consistency is enhanced.

In some embodiments, the first primary winding W1 is wound on the first winding leg 211. The second primary winding W2 is wound on the second winding leg 212. The terminal voltages of the first primary winding W1 and the second primary winding W2 are AC voltages. The direction of the AC magnetic flux generated by the first primary winding W1 is opposite to the direction of the AC magnetic flux generated by the second primary winding W2. The turn number of the first primary winding W1 and the turn number of the second primary winding W2 may be equal. Preferably but not exclusively, the first primary winding W1, the second primary winding W2, the first group of secondary windings (W3, W4), the second group of secondary windings (W5, W6) and the auxiliary winding W11 are planer PCB windings. All disclosed embodiments of the present disclosure may be applicable under this condition.

Please refer to FIG. 3 again. The primary side circuit 10 of the power module 1A is located on a first side of the magnetic element 2 along the length direction. The secondary side circuit 11 of the power module 1A is located on a second side of the magnetic element 2 along the length direction. The arrangements of the first side circuit, the second side circuit and the magnetic element in the power modules of the following embodiments are similar to that of the embodiment as shown in FIG. 3.

Figure 4:
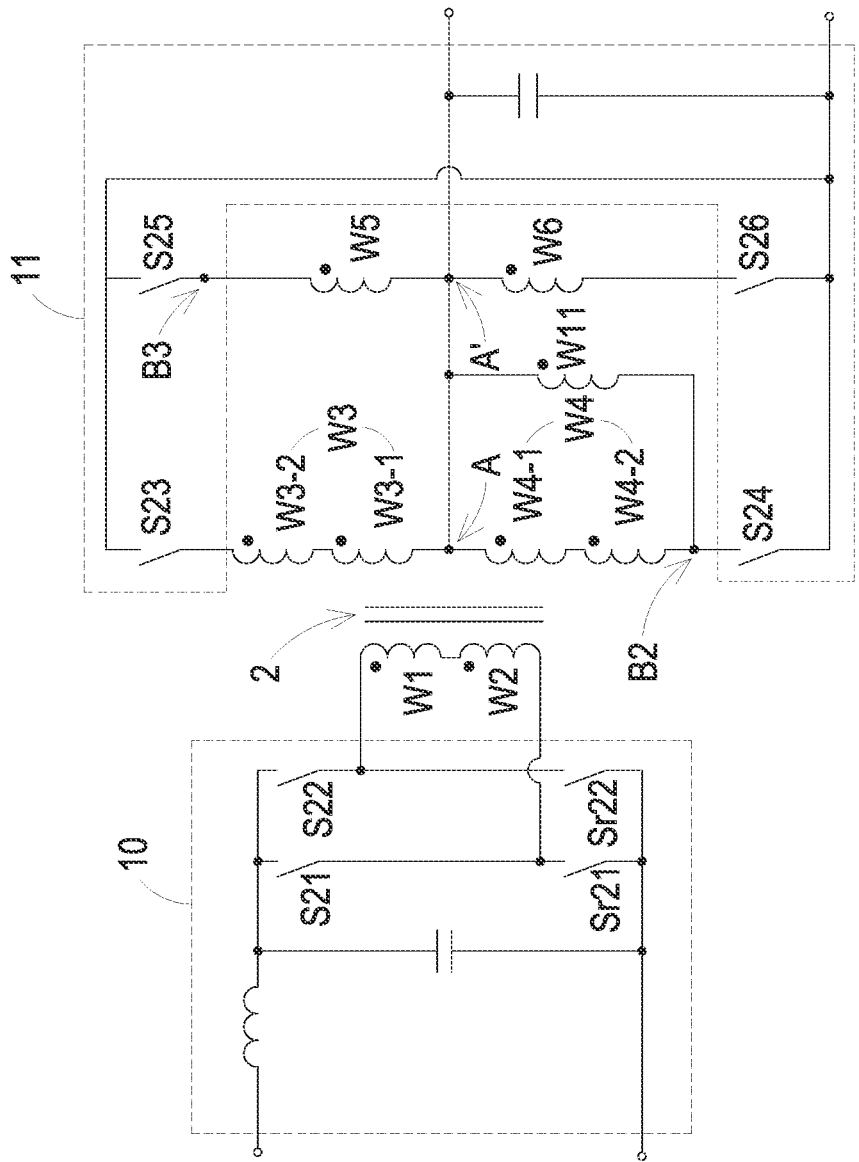
FIG. 4 is a schematic circuit diagram illustrating a power module according to a second embodiment of the present disclosure.

FIG. 4 is a schematic circuit diagram illustrating a power module according to a second embodiment of the present disclosure. In comparison with the power module 1A of the first embodiment as shown in FIG. 2, the auxiliary winding W11 of the magnetic element 2 in the power module 1B of this embodiment is electrically connected with the second secondary winding W4 in parallel. That is, one terminal of the auxiliary winding W11 is electrically connected with the node A, and the other terminal of the auxiliary winding W11 is electrically connected with the node B2.

Figure 5:
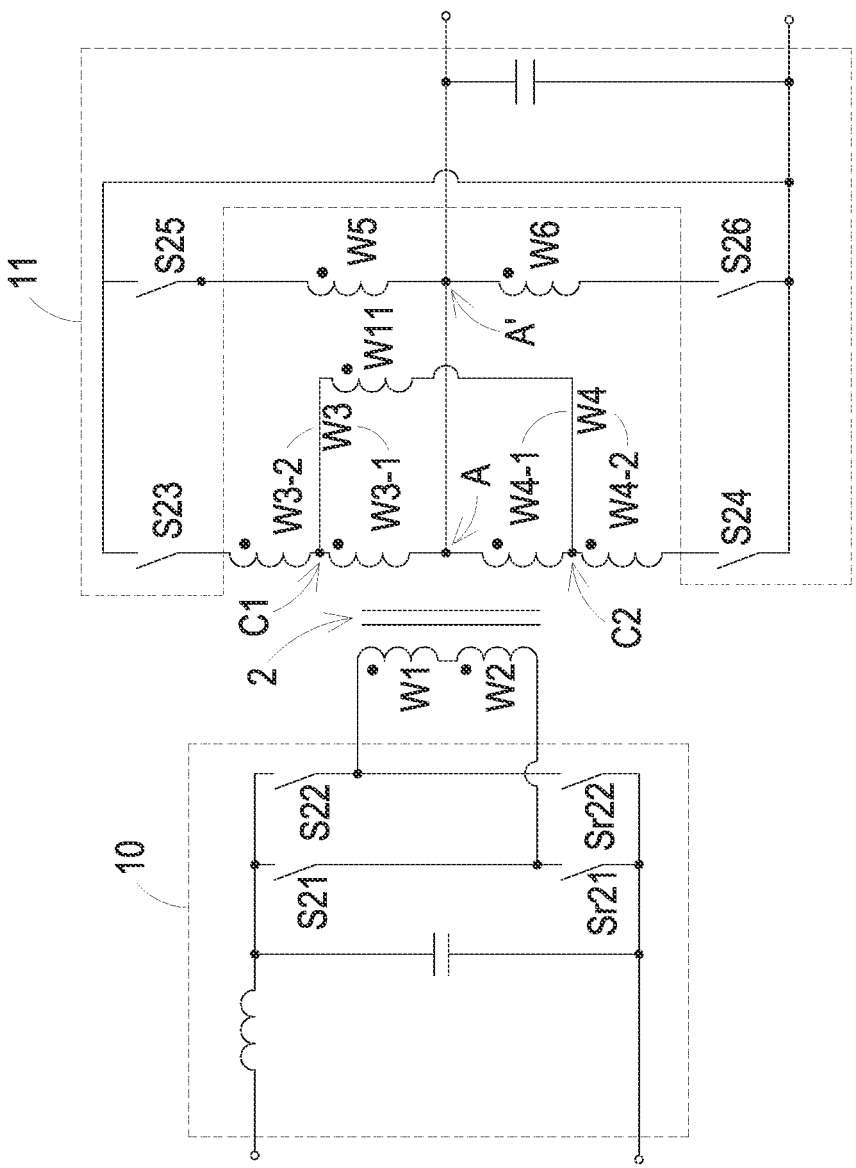
FIG. 5 is a schematic circuit diagram illustrating a power module according to a third embodiment of the present disclosure.

FIG. 5 is a schematic circuit diagram illustrating a power module according to a third embodiment of the present disclosure. In comparison with the power module 1A of the first embodiment as shown in FIG. 2, the auxiliary winding W11 of the magnetic element 2 in the power module 1C of this embodiment is electrically connected with a portion of the first secondary winding W3 and a portion of the second secondary winding W4 in parallel. That is, one terminal of the auxiliary winding W11 is electrically connected with the node C1, and the other terminal of the auxiliary winding W11 is electrically connected with the node C2. That is, the auxiliary winding W11 is electrically connected with the first winding segment W4-1 of the second secondary winding W4 and the first winding segment W3-1 of the first secondary winding W3 in parallel. The ratio between the turn number of the auxiliary winding W11 and the total turn number of the winding segments W4-1 and W3-1 is N:1. The winding direction of the auxiliary winding W11 can be wound on the first lateral leg 213 or the second lateral leg 214 with reference to FIGS. 1 and 3. The winding method is not restricted. That is, the winding method may be determined according to the practical requirements. For example, the winding methods of the winding segments W4-1 and W3-1 are identical.

In some embodiments, the auxiliary winding W11 is electrically connected with the third secondary winding W5 in parallel. In this case, the auxiliary winding W11 is wound on the second lateral leg 214 and located beside the third secondary winding W5. The operating principle is similar to that of FIG. 1.

Figure 6:
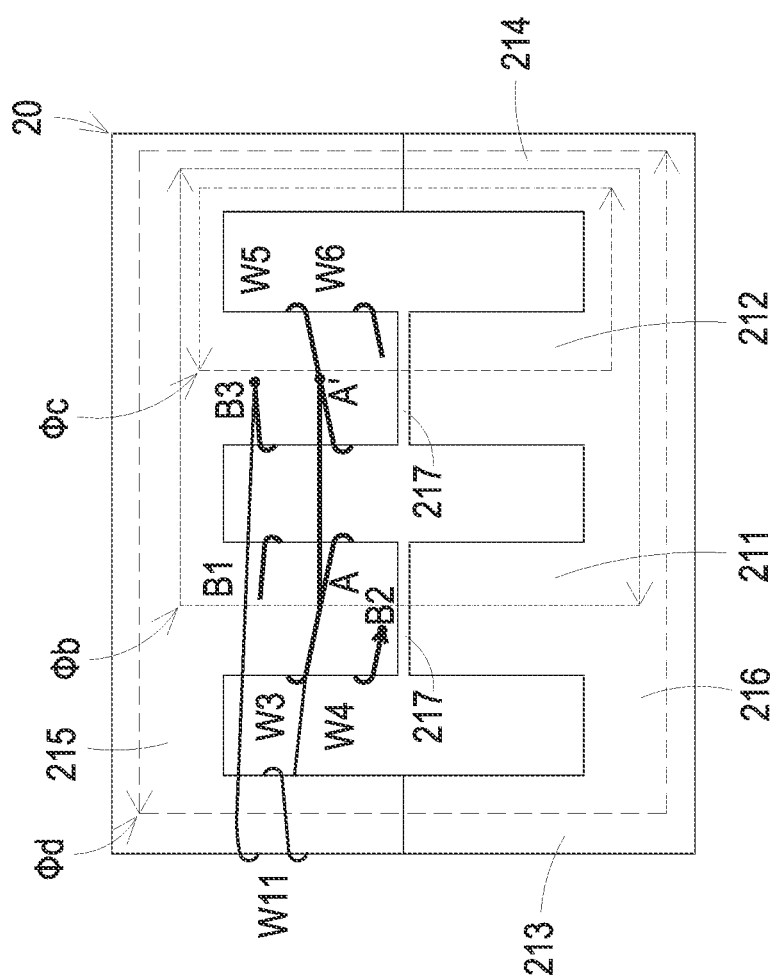
FIG. 6 is a schematic view illustrating the structure of another exemplary magnetic element.
Figure 7:
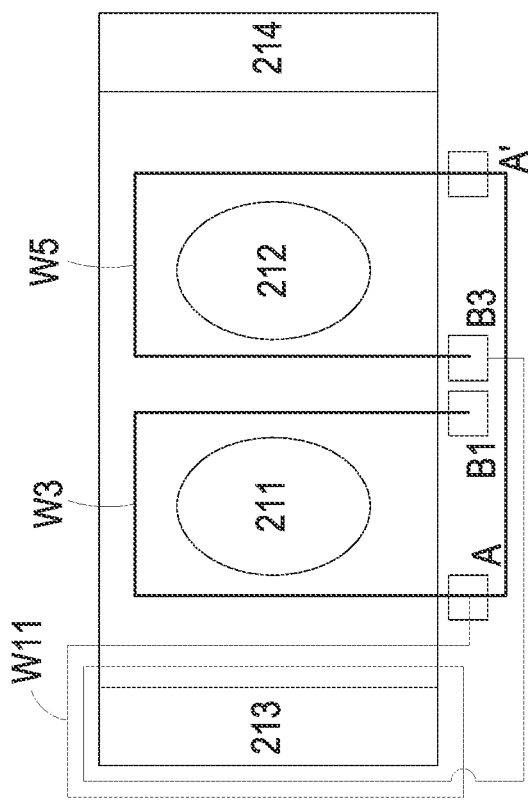
FIG. 7 schematically illustrating a winding method of the magnetic element as shown in FIG. 6.

In some other embodiments, the third secondary winding W5 is wound on the second winding leg 212, and the auxiliary winding W11 is wound on the first lateral leg 213, which is far from the second winding leg 212. Please refer to FIGS. 6 and 7. FIG. 6 is a schematic view illustrating the structure of another exemplary magnetic element. FIG. 7 schematically illustrating a winding method of the magnetic element as shown in FIG. 6. In this embodiment, the auxiliary winding W11 and the third secondary winding W5 are electrically connected with each other in parallel. The auxiliary winding W11 is wound on the first lateral leg 213. The third secondary winding W5 is wound on the second winding leg 212. Moreover, one terminal of the auxiliary winding W11 and the third secondary winding W5 are electrically connected with the node B3 (see FIG. 2), and the other terminal of the auxiliary winding W11 and the third secondary winding W5 are electrically connected with the node A'. The winding direction of the auxiliary winding W11 is identical to the winding direction of the third secondary winding W5. Moreover, the direction of the magnetic flux on the first lateral leg 213 is identical to the direction of the magnetic flux on the second winding leg 212, but opposite to the direction of the magnetic flux on the adjacent first winding leg 211.

Figure 8:
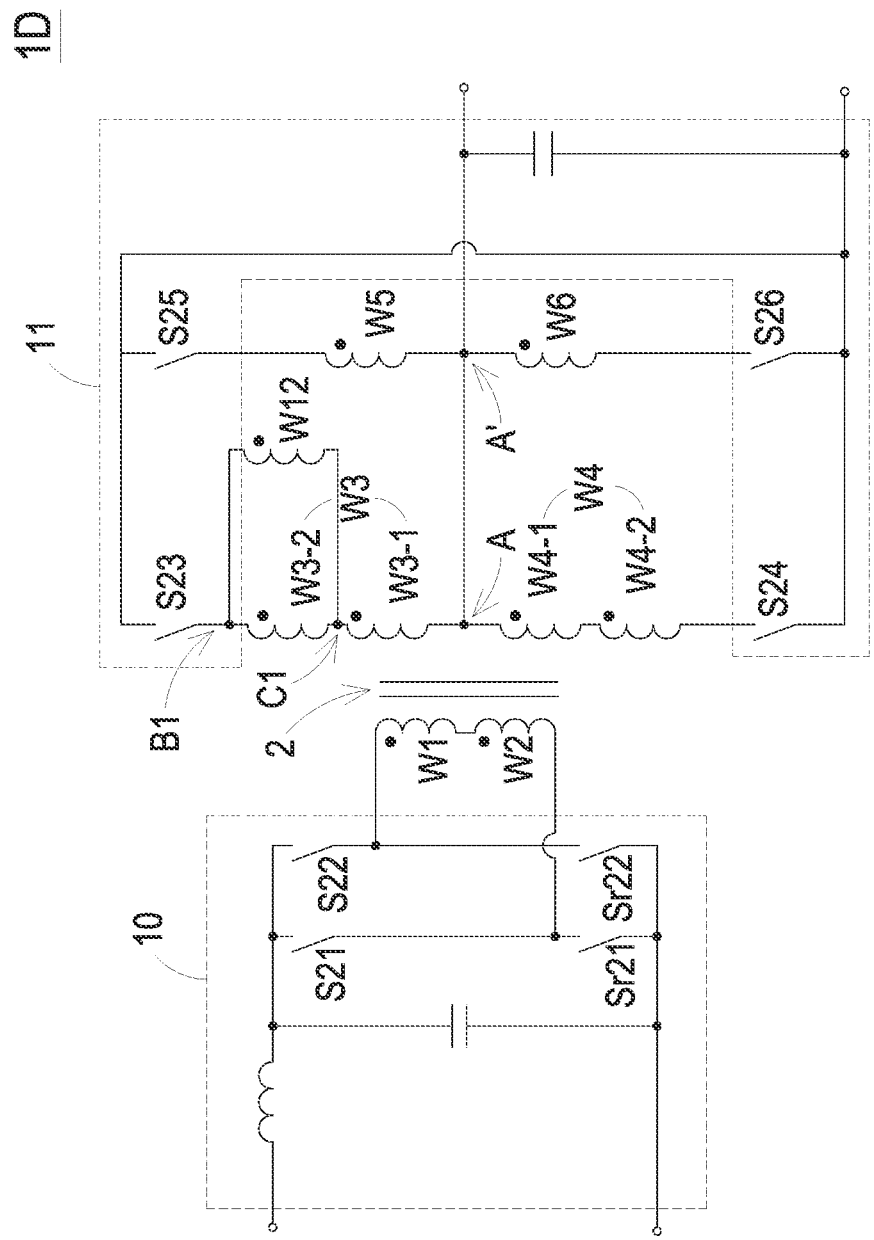
FIG. 8 is a schematic circuit diagram illustrating a power module according to a fourth embodiment of the present disclosure.
Figure 9:
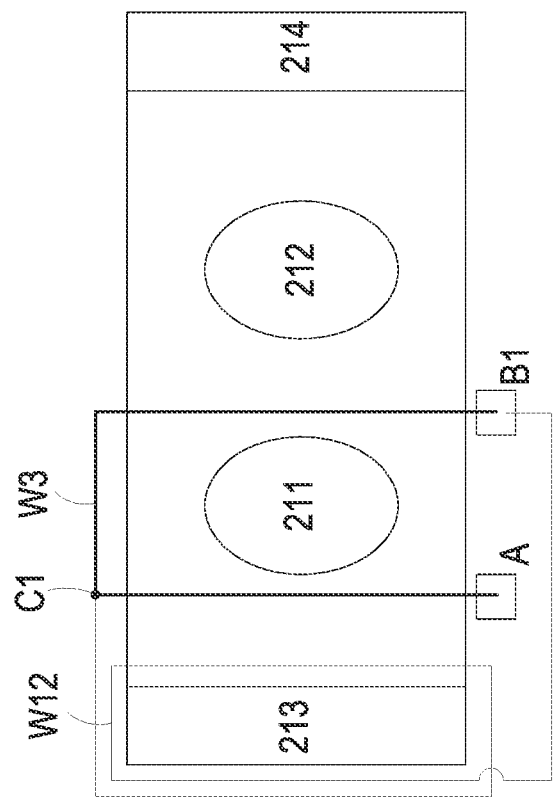
FIG. 9 schematically illustrating a winding method of the magnetic element as shown in FIG. 8.

In some embodiments, the auxiliary winding W11 is electrically connected with a winding segment of any secondary winding in parallel. Please refer to FIGS. 8 and 9. FIG. 8 is a schematic circuit diagram illustrating a power module according to a fourth embodiment of the present disclosure. FIG. 9 schematically illustrating a winding method of the magnetic element as shown in FIG. 8. In the magnetic element 2 of the power module 1D, the auxiliary winding W12 is electrically connected with the second winding segment W3-2 of the first secondary winding W3 in parallel. That is, one terminal of the auxiliary winding W12 is electrically connected with the node B1, and the other terminal of the auxiliary winding W12 is electrically connected with the node C1. The ratio between the turn number of the auxiliary winding W12 and the turn number of the winding segment W3-2 is N:1, wherein the auxiliary winding W12 and the winding segment W3-2 is defined as a parallel-connected winding set, and N is a positive integer. In this embodiment, the ratio between the turn number of the auxiliary winding W12 and the turn number of the first winding segment W3-2 is 2:1, and the turn number of the first secondary winding W3 is 1. In case that the first secondary winding W3 is wound on the first winding leg 211 in a counterclockwise direction, the auxiliary winding W12 is wound on the first lateral leg 213 in a clockwise direction. Moreover, one terminal of the auxiliary winding W12 and the second winding segment W3-2 of the first secondary winding W3 are electrically connected with the node C1, and the other terminal of the auxiliary winding W12 and the second winding segment W3-2 of the first secondary winding W3 are electrically connected with the node B1. Moreover, the auxiliary winding W12 is electrically connected with the second winding segment W3-2 of the first secondary winding W3 in parallel. The terminal voltage of the auxiliary winding W12 is clamped by the terminal voltage of the second winding segment W3-2 of the first secondary winding W3. Since the magnetic potential of the first lateral leg 213 is clamped, the distribution of the AC magnetic flux in the magnetic element 2 is controllable.

In some other embodiments, the auxiliary winding W12 is electrically connected with the winding segment of another secondary winding in parallel. For example, the auxiliary winding W12 is electrically connected with the first winding segment W3-1, the first winding segment W4-1 or the second winding segment W4-2 in parallel. Alternatively, the auxiliary winding W12 is electrically connected with the winding segment of the third secondary winding W5 or the winding segment of the fourth secondary winding W6 in parallel. Alternatively, the auxiliary winding W12 is wound on the second lateral leg 214 according to the practical requirements. The winding method can be referred to FIGS. 8 and 9. The winding direction of the auxiliary winding on the lateral leg and the winding direction of the secondary winding on the adjacent winding leg are opposite. Moreover, the ratio between the turn number of the auxiliary winding and the turn number of the winding segment of the secondary winding is N:1, wherein N is a positive integer.

In some other embodiments, the auxiliary winding is electrically connected with any primary winding or a winding segment of any primary winding in parallel.

Figure 10:
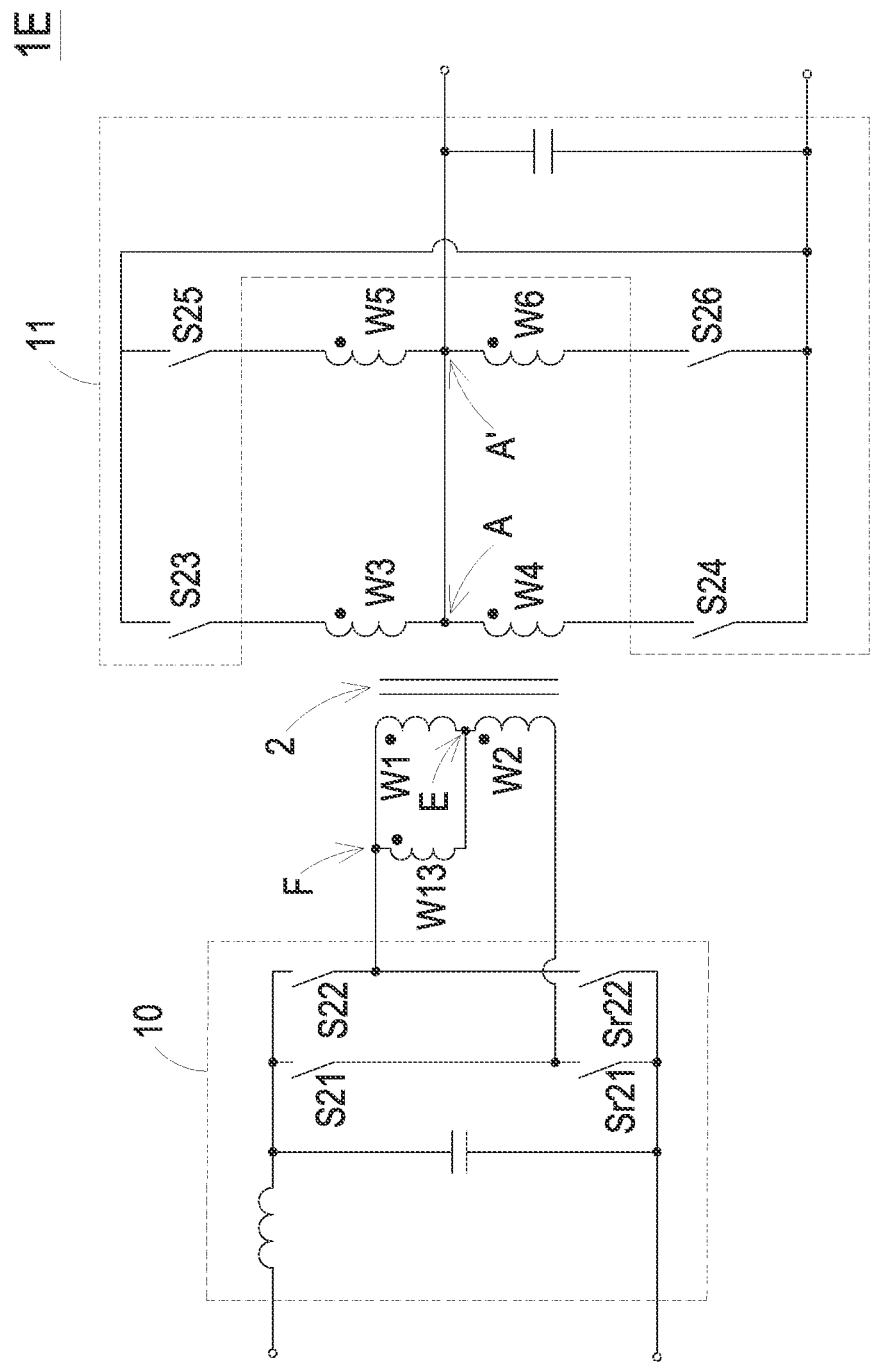
FIG. 10 is a schematic circuit diagram illustrating a power module according to a fifth embodiment of the present disclosure.

FIG. 10 is a schematic circuit diagram illustrating a power module according to a fifth embodiment of the present disclosure. In comparison with the above embodiments, the auxiliary winding W13 of the magnetic element 2 in the power module 1E of this embodiment is electrically connected with the first primary winding W1 in parallel. That is, the two terminals of the auxiliary winding W13 and the two terminals of the first primary winding W1 are connected with the node E and the node F, respectively. Moreover, the ratio between the turn number of the auxiliary winding 13 and the turn number of the first primary winding W1 is N:1, wherein N is a positive integer.

Figure 11:
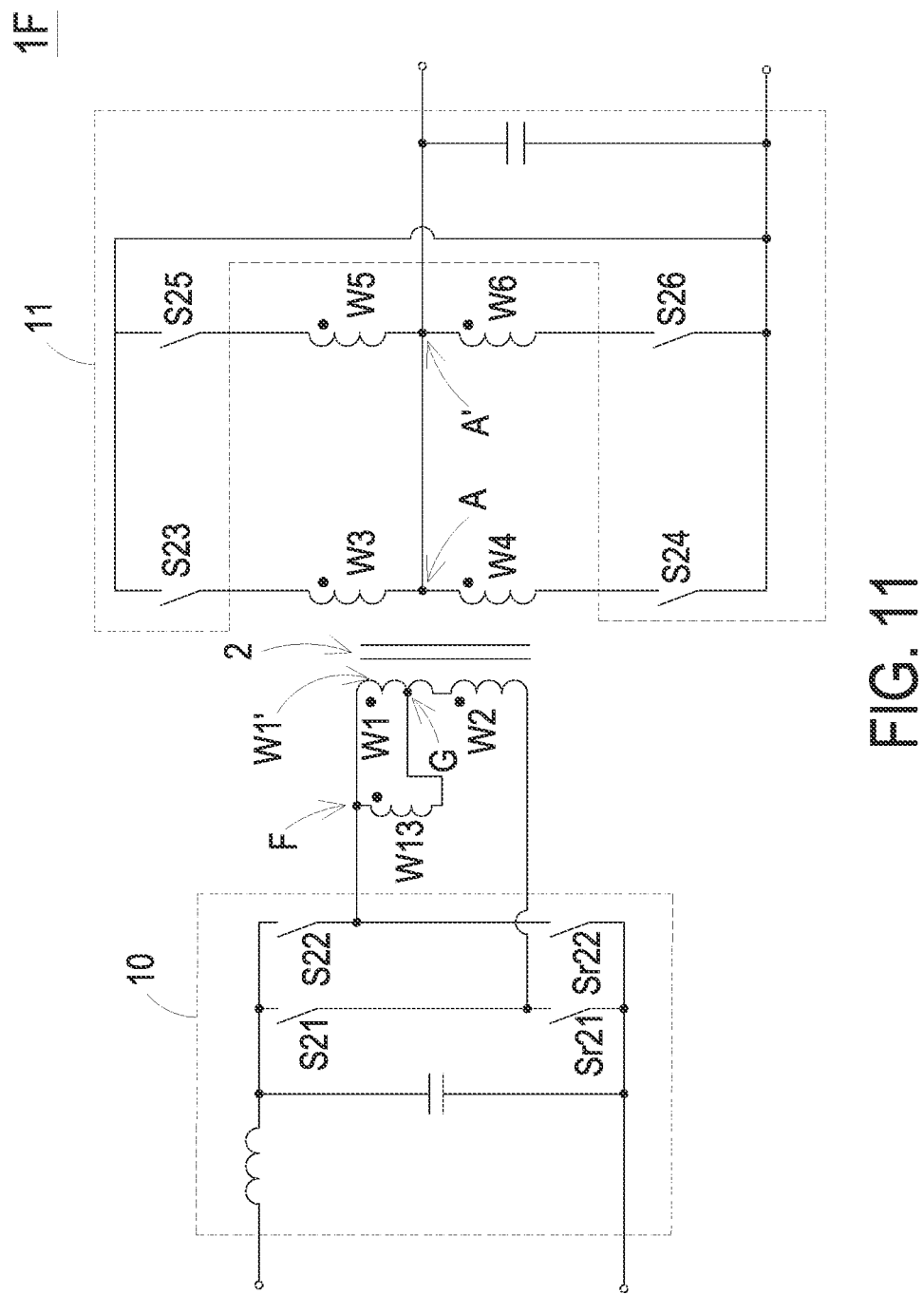
FIG. 11 is a schematic circuit diagram illustrating a power module according to a sixth embodiment of the present disclosure.
Figure 12:
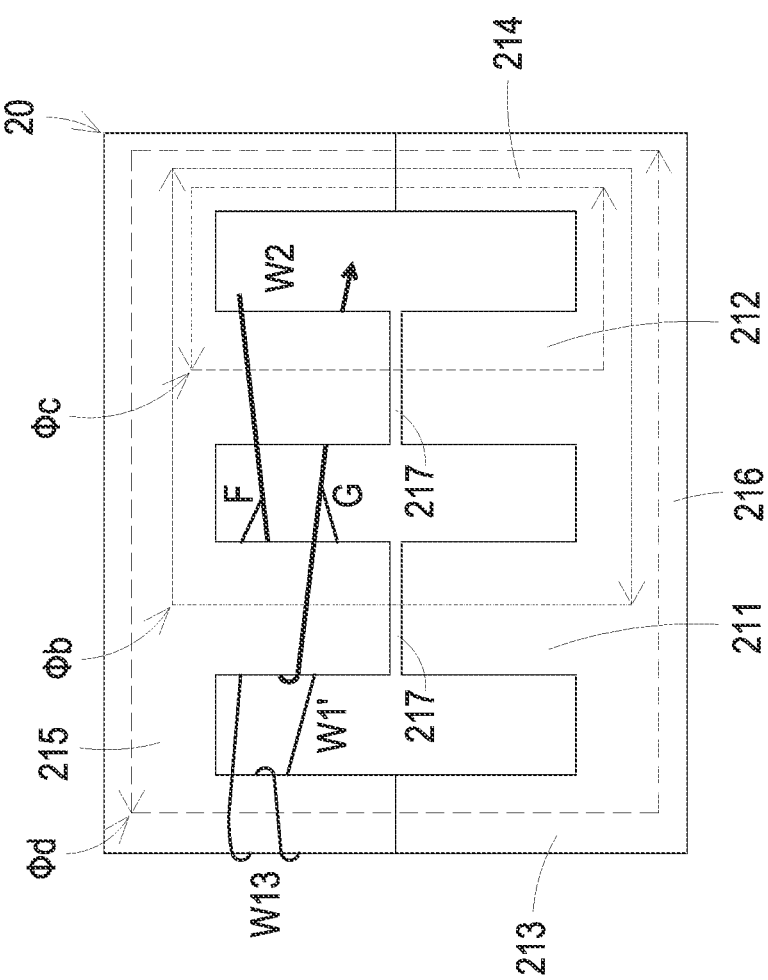
FIG. 12 is a schematic view illustrating the structure of a magnetic element of the power module as shown in FIG. 11.
Figure 13:
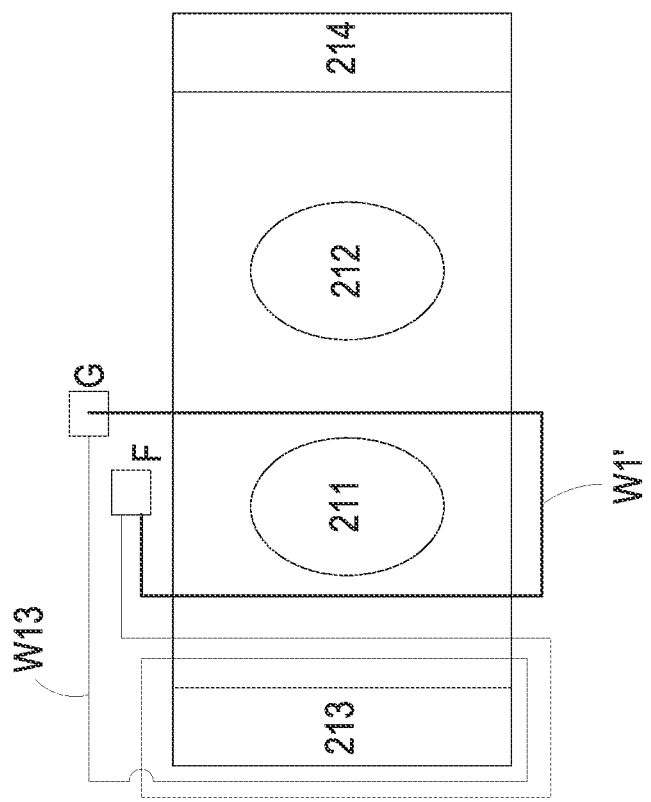
FIG. 13 schematically illustrating a winding method of the magnetic element as shown in FIG. 12.

Please refer to FIGS. 11, 12, and 13. FIG. 11 is a schematic circuit diagram illustrating a power module according to a sixth embodiment of the present disclosure. FIG. 12 is a schematic view illustrating the structure of a magnetic element of the power module as shown in FIG. 11. FIG. 13 schematically illustrates a winding method of the magnetic element as shown in FIG. 12. The auxiliary winding W13 of the magnetic element 2 in the power module 1F of this embodiment is electrically connected with the winding segment W1' of the first primary winding W1 in parallel, wherein the winding segment W1' of the first primary winding W1 is defined by dividing the first primary winding W1 at the node G. That is, the two terminals of the auxiliary winding W13 and the two terminals of the winding segment W1' are connected with the node G and the node F, respectively.

In an example, the turn number of the winding segment W1' is 1, and the auxiliary winding W13 is 2. The winding method may be referred to FIGS. 11 and 12. In FIG. 11, only the winding segment W1' of the first primary winding W1 and the second primary winding W2 are shown. The winding segment W1' of the first primary winding W1 is wound on the first winding leg 211. The second primary winding W2 is wound on the second winding leg 212. The winding segment W1' of the first primary winding W1 and the second primary winding W2 are electrically connected with each other. The auxiliary winding W13 is wound on the first lateral leg 213. The two terminals of the auxiliary winding W13 and the two terminals of the winding segment W1' are connected with the node G and the node F, respectively. Please refer to FIG. 12. In case that the winding segment W1' is wound on the first winding leg 211 in a clockwise direction, the auxiliary winding W13 is wound on the first lateral leg 213 in a counterclockwise direction. The auxiliary winding W13 and the winding segment W1' are electrically connected in parallel and connected between the node F and the node G. The winding width of the auxiliary winding w13 and the distribution of the AC magnetic flux in the magnetic core may similar to those of the above embodiments, and not redundantly described herein.

In some other embodiments, the auxiliary winding W13 may be electrically connected with any winding segment of the first primary winding W1 in parallel, or electrically connected with any winding segment of the second primary winding W2 in parallel. The auxiliary winding W13 may be wound on the second lateral leg 214 as long as the ratio between the turn number of the auxiliary winding W13 and the turn number of the winding segment of the first primary winding W1 is N:1. Consequently, a portion of the AC magnetic flux in the magnetic element is balanced, the size of the magnetic element is reduced, and the distribution of the magnetic flux in the magnetic element is controllable.

In the above embodiments, the auxiliary winding is electrically connected with a portion or the entire of the primary winding or a portion or the entire of the secondary winding in parallel, and the auxiliary winding is wound on one lateral leg. Consequently, the size of the magnetic element is reduced, and the distribution of the magnetic flux in the magnetic element is controllable. The technology of the present disclosure can be applied to other circuit topologies. For example, the primary side circuit is a half-bridge circuit, and the secondary side is a full-bridge rectifier circuit. In the following example, the secondary side is a full-bridge rectifier circuit.

Figure 14:
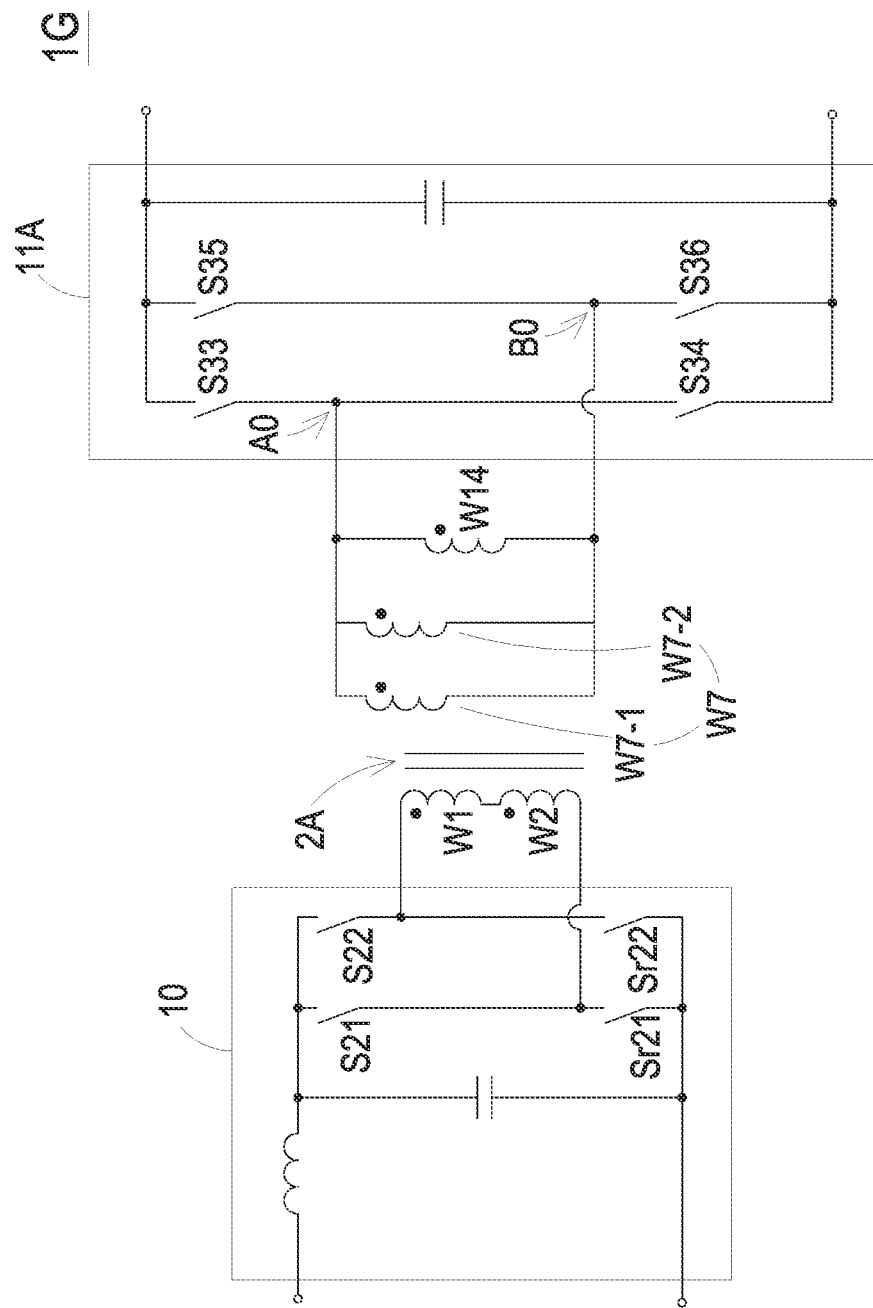
FIG. 14 is a schematic circuit diagram illustrating a power module according to a seventh embodiment of the present disclosure.
Figure 15:
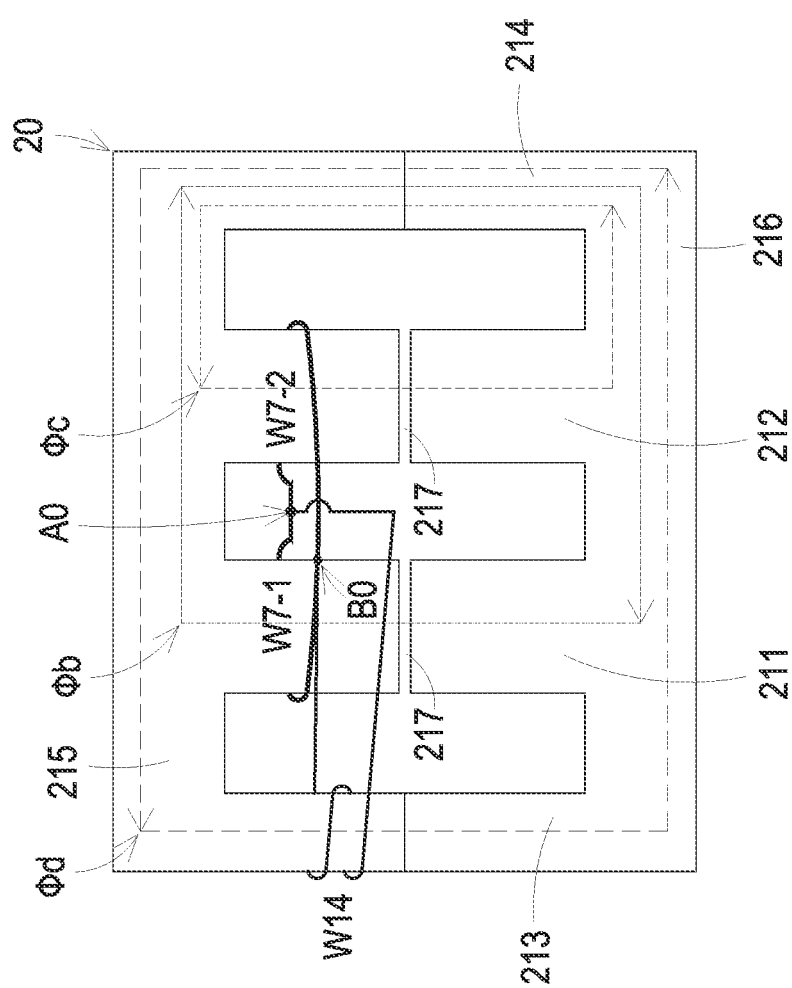
FIG. 15 is a schematic view illustrating the structure of a magnetic element of the power module as shown in FIG. 14.
Figure 16:
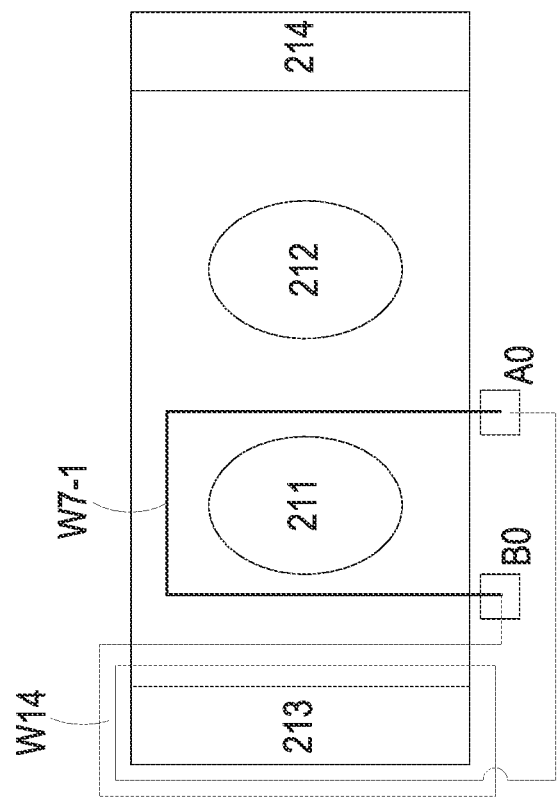
FIG. 16 schematically illustrating a winding method of the magnetic element as shown in FIG. 15.

Please refer to FIGS. 14, 15 and 16. FIG. 14 is a schematic circuit diagram illustrating a power module according to a seventh embodiment of the present disclosure. FIG. 15 is a schematic view illustrating the structure of a magnetic element of the power module as shown in FIG. 14. FIG. 16 schematically illustrates a winding method of the magnetic element as shown in FIG. 15. The secondary side circuit 11A of the power module 1G is a full-bridge rectifier circuit comprising four third switching units S33, S3, S35 and S36. The third switching unit S33 and the third switching unit S34 are connected with each other and collaboratively formed as a third bridge arm. The third switching unit S35 and the third switching unit S36 are connected with each other and collaboratively formed as a fourth bridge arm. In this embodiment, the magnetic element 2A of the power module 1G includes a first secondary winding W1, a second primary winding W2, a secondary winding W7 and an auxiliary winding W14. The secondary winding W7 is served as a parallel-connected winding set and electrically connected with the auxiliary winding W14 in parallel. Moreover, the ratio between the turn number of the auxiliary winding W14 and the turn number of the secondary winding W7 is N:1.

The winding method can be seen in FIGS. 15 and 16. The secondary winding W7 includes a plurality of sub-windings connected in parallel. The turn numbers of the sub-windings are identical. For example, the secondary winding W7 includes a first sub-winding W7-1 and a second sub-winding W7-2, which are electrically connected with each other in parallel. The first sub-winding W7-1 and the second sub-winding W7-2 are also electrically connected with the auxiliary winding W14 in parallel. Moreover, the ratio between the turn number of the auxiliary winding W14 and the turn number of the sub-winding W7-1 (W7-2) is N:1. For example, the turn number the sub-winding W7-1 (W7-2) is 1. The first sub-winding W7-1 is wound on the first winding leg 211. The second sub-winding W7-2 is wound on the second winding leg 212. The first sub-winding W7-1 and the second sub-winding W7-2 are connected between the midpoint A0 of the third bridge arm and the midpoint B0 of the fourth bridge arm. The winding direction of the first sub-winding W7-1 and the winding direction of the second sub-winding W7-2 are opposite. The auxiliary winding W14 is wound on the first lateral leg 213. The winding direction of the auxiliary winding W14 and the winding direction of the first sub-winding W7-1 are opposite. In FIG. 16, only first sub-winding W7-1 is shown. The first sub-winding W7-1 is wound on the first winding leg 211 in a clockwise direction, and the turn number is 1. The auxiliary winding W14 is wound on the first lateral leg 213 in a counterclockwise direction, and the turn number is 2.

In the above embodiments, the magnetic element includes two winding legs. In some embodiments, the magnetic element includes 2× winding legs, wherein X is a positive integer larger than 1. For example, the magnetic element includes four winding legs.

Figure 17:
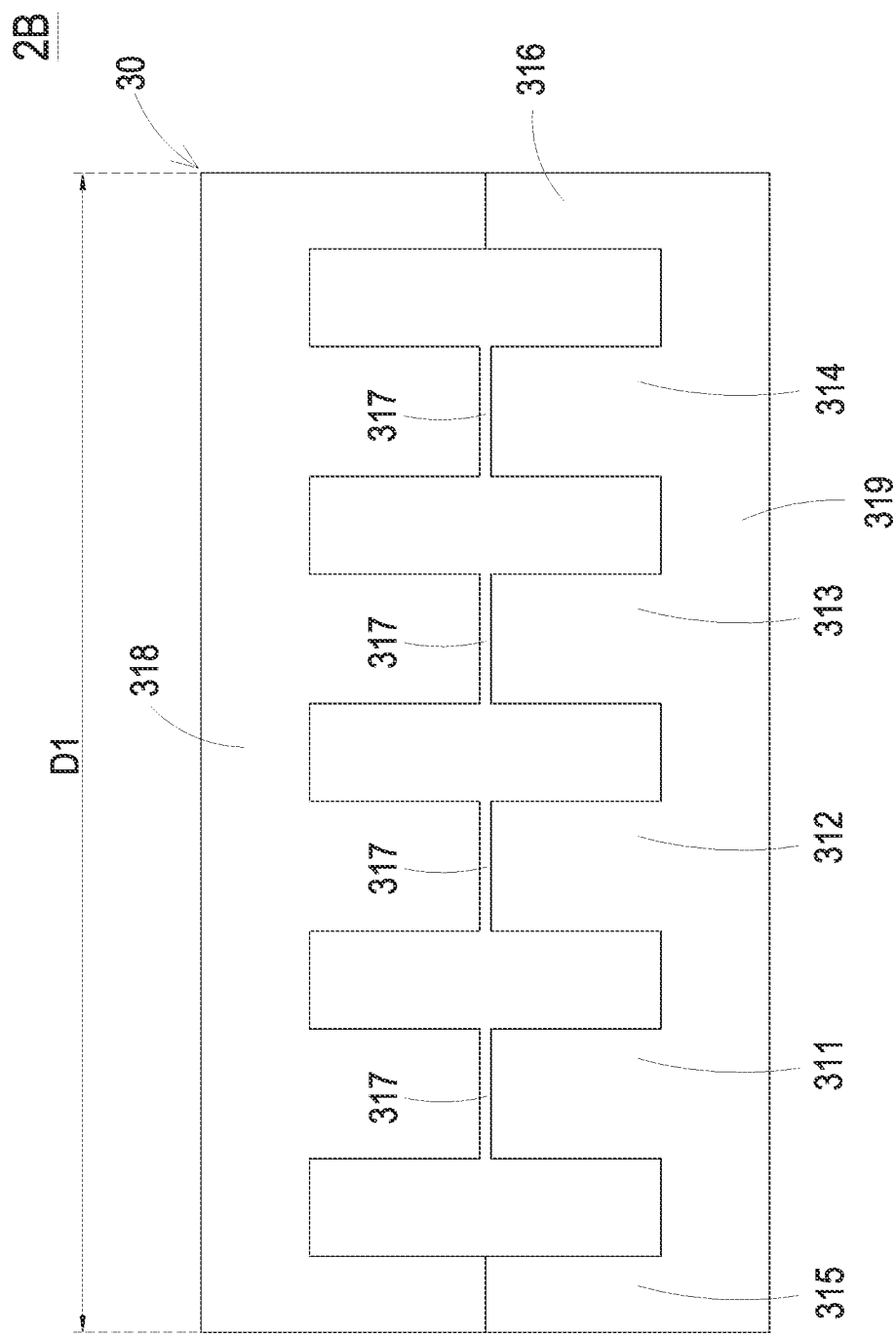
FIG. 17 is a schematic view illustrating the structure of another exemplary magnetic element.

FIG. 17 is a schematic view illustrating the structure of another exemplary magnetic element. The magnetic element 2B includes a magnetic core 30. The magnetic core 30 includes a first winding leg 311, a second winding leg 312, a third winding leg 313, a fourth winding leg 314, a first lateral leg 315, a second lateral leg 316, a first connection part 318 and a second connection part 319. The first lateral leg 315, the second lateral leg 316, the first connection part 318 and the second connection part 319 are similar to those of FIG. 1, and not redundantly described herein. Moreover, the first winding leg 311, the second winding leg 312, the third winding leg 313 and the fourth winding leg 314 are sequentially arranged along the linear direction D1. Moreover, each of the first winding leg 311, the second winding leg 312, the third winding leg 313 and the fourth winding leg 314 includes a first air gap 317.

Figure 18:
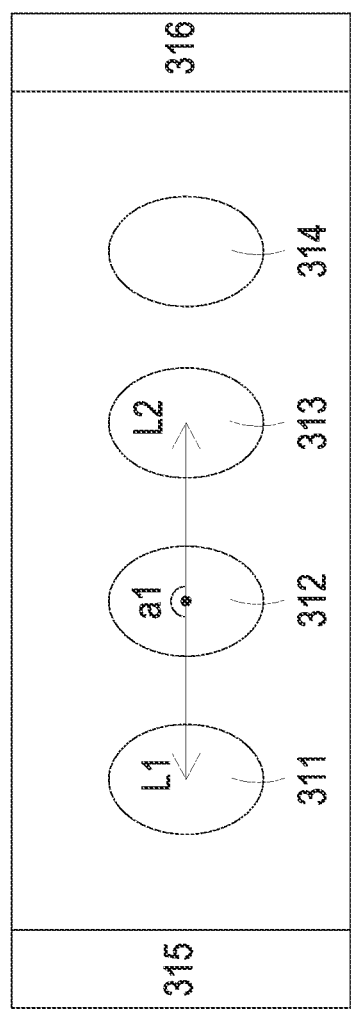
FIG. 18 is an example illustrating the relative locations of the winding legs of the magnetic core as shown in FIG. 17.
Figure 19:
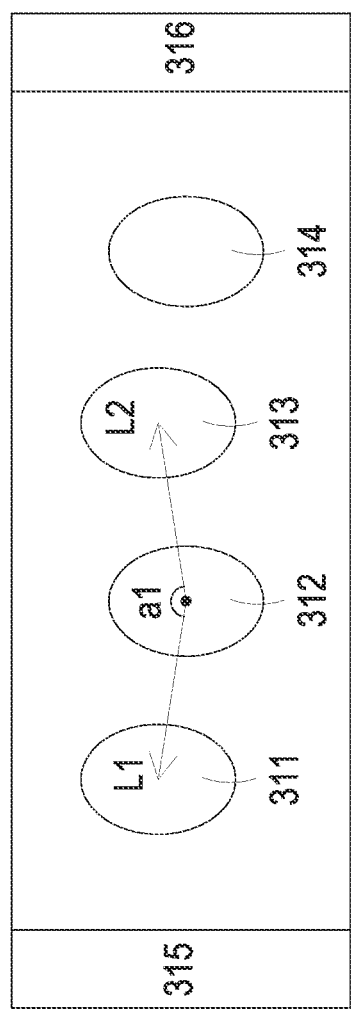
FIG. 19 is another example illustrating the relative locations of the winding legs of the magnetic core as shown in FIG. 17.

As mentioned above, the first winding leg 311, the second winding leg 312, the third winding leg 313 and the fourth winding leg 314 are sequentially arranged along the linear direction D1. However, the relative locations of these winding legs may be varied according to the practical requirements. FIG. 18 is an example illustrating the relative locations of the winding legs of the magnetic core as shown in FIG. 17. FIG. 19 is another example illustrating the relative locations of the winding legs of the magnetic core as shown in FIG. 17. In the example of FIG. 18, the first winding leg 311, the second winding leg 312, the third winding leg 313 and the fourth winding leg 314 of the magnetic core 30 are aligned with each other. In the example of FIG. 19, the first winding leg 311, the second winding leg 312, the third winding leg 313 and the fourth winding leg 314 of the magnetic core 30 are staggered. A first line L1 passes through the second winding leg 312 and the first winding leg 311. A second line L2 passes through the second winding leg 312 and the third winding leg 313. An angle a1 between the first line L1 and the second line L2 is larger than 90 degrees.

Figure 20:
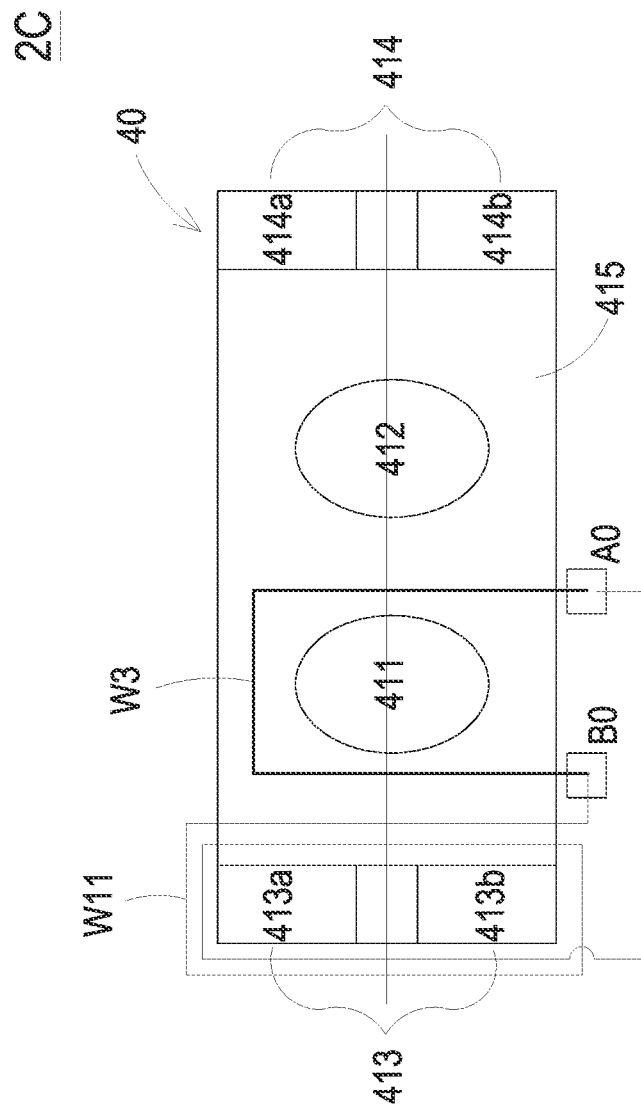
FIG. 20 is a schematic view illustrating the structure of another exemplary magnetic element.

In the above embodiments, each of the first lateral leg and the second lateral leg may have a single leg structure. In some embodiments, at least one of the first lateral leg and the second lateral leg is divided into a plurality of sub-leg structures, which are separated from each other. FIG. 20 is a schematic view illustrating the structure of another exemplary magnetic element. The magnetic element 2C includes a magnetic core 40. The magnetic core 40 includes a first lateral leg 413, a second lateral leg 414, a first winding leg 411 and a second winding leg 412. The first lateral leg 413 includes two separate sub-leg structures 413a and 413b. The second lateral leg 414 includes two separate sub-leg structures 414a and 414b. The winding methods of the first secondary winding W3 and the auxiliary winding W11 (see FIG. 2) will be described. The auxiliary winding W11 is wound around the sub-leg structures 413a and 413b. The direction of the magnetic flux flowing through the sub-leg structure 413a is identical to the direction of the magnetic flux flowing through the sub-leg structure 413b. The direction of the magnetic flux flowing through the sub-leg structure 414a is identical to the direction of the magnetic flux flowing through the sub-leg structure 414b. The direction of the magnetic flux flowing through the sub-leg structure 413a (or 413b) is opposite to the direction of the magnetic flux flowing through the sub-leg structure 414a (or 414b). The number of the sub-leg structures in the lateral leg of the magnetic element is not restricted as long as the auxiliary winding is wound around a portion of the sub-leg structures. Consequently, the direction of the magnetic flux flowing through some sub-leg structures is opposite to the direction of the magnetic flux flowing through the other sub-leg structures.

From the above descriptions, the present disclosure provides a magnetic element and a power module with the magnetic element. An auxiliary winding is wound on a lateral leg. According to the ratio between the turn number of the auxiliary winding and the turn number of the parallel-connected winding set, the AC magnetic flux flowing through the first connection part and the second connection part of the magnetic core is reduced. Consequently, the AC magnetic flux flowing through each part of the magnetic element may be controllable, and the magnetic element can be designed in a simplified manner. In such way, the magnetic element is suitable for mass production while maintaining the performance consistency.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A magnetic element, comprising:
   at least one primary winding;
   at least one secondary winding, wherein at least one of a winding segment or an entire of the at least one primary winding and a winding segment or an entire of the at least one secondary winding is defined as a parallel-connected winding set;
   a magnetic core comprising a plurality of winding legs, a first lateral leg, a second lateral leg, a first connection part, and a second connection part, wherein the plurality of winding legs, the first lateral leg, and the second lateral leg are arranged between the first connection part and the second connection part, the plurality of winding legs are sequentially arranged along a linear direction, and the first lateral leg and the second lateral leg are respectively arranged on both sides of the plurality of winding legs, wherein the at least one primary winding and the at least one secondary winding are wound around each winding leg, and directions of magnetic fluxes through every two adjacent winding legs are opposite; and
   an auxiliary winding wound on one of the first lateral leg and the second lateral leg, and electrically connected with the parallel-connected winding set, wherein a turn ratio of the auxiliary winding to the parallel-connected winding set is N:1, wherein N is a positive value,
   wherein a direction of a magnetic flux generated by the auxiliary winding is opposite to a direction of the magnetic flux through the adjacent winding leg.

2. The magnetic element according to claim 1, wherein the plurality of winding legs comprise a first winding leg and a second winding leg, and the at least one secondary winding comprises a first secondary winding, a second secondary winding, a third secondary winding, and a fourth secondary winding with a same turn number, wherein the first secondary winding and the second secondary winding are wound on the first winding leg, and the third secondary winding and the fourth secondary winding are wound on the second winding leg.

3. The magnetic element according to claim 2, wherein the first secondary winding and the second secondary winding are electrically connected with each other, and the third secondary winding and the fourth secondary winding are electrically connected with each other.

4. The magnetic element according to claim 2, wherein the parallel-connected winding set comprises the winding segment or the entire of one of the first secondary winding, the second secondary winding, the third secondary winding, and the fourth secondary winding, and the auxiliary winding is electrically connected with the parallel-connected winding set.

5. The magnetic element according to claim 2, wherein the parallel-connected winding set comprises the winding segments of two of the first secondary winding, the second secondary winding, the third secondary winding, and the fourth secondary winding, and the auxiliary winding is electrically connected with the parallel-connected winding set.

6. The magnetic element according to claim 1, wherein the at least one primary winding comprises a first primary winding and a second primary winding with a same turn number, wherein the parallel-connected winding set comprises the winding segment or the entire of one of the first primary winding and the second primary winding, and the auxiliary winding is electrically connected with the parallel-connected winding set.

7. The magnetic element according to claim 1, wherein the at least one secondary winding comprises one secondary winding comprising two sub-windings with a same turn number, wherein the two sub-windings are electrically connected with each other in parallel and wound on the corresponding winding legs, wherein the parallel-connected winding set comprises one of the two sub-windings.

8. The magnetic element according to claim 1, wherein the turn ratio of the auxiliary winding to the parallel-connected winding set is 2:1.

9. The magnetic element according to claim 8, wherein a cross-sectional area of each lateral leg along the linear direction is a half of a cross-sectional area of each winding leg along the linear direction.

10. The magnetic element according to claim 1, wherein a power transferred through the auxiliary winding is equal to or lower than 50% of a total power transferred through the magnetic element.

11. The magnetic element according to claim 1, wherein a direction of a magnetic flux through the first lateral leg and a direction of a magnetic flux through the second lateral leg are opposite.

12. The magnetic element according to claim 1, wherein a cross-sectional area of each lateral leg along the linear direction is a half of a cross-sectional area of each winding leg along the linear direction.

13. The magnetic element according to claim 1, wherein each of the first lateral leg and the second lateral leg comprises a single leg structure.

14. The magnetic element according to claim 1, wherein each of the first lateral leg and the second lateral leg comprises a plurality of sub-leg structures, wherein directions of magnetic fluxes through the plurality of sub-leg structures of the first lateral leg are identical, and directions of magnetic fluxes through the plurality of sub-leg structures of the second lateral leg are identical.

15. The magnetic element according to claim 1, wherein a number of the plurality of winding legs is even and larger than 2.

16. A power module, comprising:
a magnetic element comprising at least one primary winding, at least one secondary winding, a magnetic core, and an auxiliary winding, wherein at least one of a winding segment or an entire of the at least one primary winding and a winding segment or an entire of the at least one secondary winding is defined as a parallel-connected winding set, and the magnetic core includes a plurality of winding legs, a first lateral leg, a second lateral leg, a first connection part and a second connection part, wherein the plurality of winding legs, the first lateral leg and the second lateral leg are arranged between the first connection part and the second connection part, the plurality of winding legs are sequentially arranged along a linear direction, the first lateral leg and the second lateral leg are respectively arranged on both sides of the plurality of winding legs, the at least one primary winding and the at least one secondary winding are wound around each winding leg, and directions of magnetic fluxes through every two adjacent winding legs are opposite, wherein the auxiliary winding is wound on one of the first lateral leg and the second lateral leg, and electrically connected with the parallel-connected winding set, wherein a turn ratio of the auxiliary winding to the parallel-connected winding set is N:1, and N is a positive value, wherein a direction of a magnetic flux generated by the auxiliary winding is opposite to a direction of the magnetic flux through the adjacent winding leg;
a primary side circuit electrically connected with the at least one primary winding; and
a secondary side circuit electrically connected with the at least one secondary winding.

17. The power module according to claim 16, wherein the primary side circuit and the secondary side circuit are arranged along a length direction of the first connection part, and the primary side circuit and the secondary side circuit are opposed to each other with respect to the magnetic element.

18. The power module according to claim 16, wherein the primary side circuit is a full-bridge circuit or a half-bridge circuit.

19. The power module according to claim 16, wherein the secondary side circuit comprises a center-tapped rectifier circuit or a full-bridge rectifier circuit.

* * * * *